(No Model.)

G. P. SALISBURY.
MACHINE FOR MAKING SAWS.

No. 555,620.    Patented Mar. 3, 1896.

Witnesses.

Inventor.
George P. Salisbury
By his atty.
Geo. D. Phillips (No Model.) 7 Sheets—Sheet 3.

G. P. SALISBURY.
MACHINE FOR MAKING SAWS.

No. 555,620. Patented Mar. 3, 1896.

WITNESSES:
A. J. Tanner.
F. R. Hoyt.

INVENTOR:
George P. Salisbury.
By his Atty.
Geo. D. Phillips.

(No Model.) 7 Sheets—Sheet 4.

G. P. SALISBURY.
MACHINE FOR MAKING SAWS.

No. 555,620. Patented Mar. 3, 1896.

Witnesses.
A. J. Tanner
L. R. Hoyt.

Inventor.
George P. Salisbury.
By his Atty.
Geo. D. Phillips.

(No Model.) 7 Sheets—Sheet 5.

G. P. SALISBURY.
MACHINE FOR MAKING SAWS.

No. 555,620. Patented Mar. 3, 1896.

Witnesses.
A. J. Tanner
L. R. Hoyt

Inventor
George P. Salisbury
By his Atty.
Geo. L. Phillips.

UNITED STATES PATENT OFFICE.

GEORGE P. SALISBURY, OF NEW HAVEN, CONNECTICUT, ASSIGNOR TO REUBEN H. BROWN, OF SAME PLACE, AND LEWIS A. PLATT, OF WATERBURY, CONNECTICUT.

MACHINE FOR MAKING SAWS.

SPECIFICATION forming part of Letters Patent No. 555,620, dated March 3, 1896.

Application filed April 28, 1893. Serial No. 472,223. (No model.)

*To all whom it may concern:*

Be it known that I, GEORGE P. SALISBURY, a citizen of the United States, and a resident of New Haven, in the county of New Haven and State of Connecticut, have invented certain new and useful Improvements in Machines for Making Saws, of which the following is a specification.

My invention pertains to certain novel and useful improvements in the manufacture of saw-blades, and relates to the mechanism for forming the teeth and other necessary work on the blade.

To this end my invention consists in serially arranging the machine into three divisions, each of which carries the necessary tools for performing a distinct part of the three operations for forming a completed saw-blade, for which purpose I prefer to employ the steel in the form of a ribbon of the proper width and thickness and to deliver the same from a reel to the said machine. The first operation consists in serrating or cutting teeth preferably in both edges of the steel ribbon with a pitch coarser than required for the blade when finished. In other words, if the pitch of the teeth in the finished blade is to be fourteen to the inch, the first operation will form teeth of one-half the required pitch, or seven to the inch, and at the same time punch the holes for the saw when completed. The next step consists in automatically feeding the strip, or so much of it as has been treated by the first division or press, to the second press, which contains tools similar to those of the first press, but which, for reasons that will hereinafter be more fully explained, are reversed. In this second operation the proper pitch is established by forming a tooth in the large blank of the coarser tooth previously formed, it being clearly understood that in forming the cutting edges or points of the saw-blade no dependence is placed on the points or V-shaped roots of the punches or dies, as it would be impossible to preserve the former or make the latter sharp enough for the purpose. Such cutting edges and points, however, are formed by the line of demarcation of the second punches and dies in the before-mentioned large tooth. Next, the saw-ribbon is automatically carried forward to the third press, where the teeth are set and a completed saw-blade is severed from the strip. The so-called "presses" or "divisions" of the machine are so arranged upon their supporting bed or table that they are capable of longitudinal adjustment thereon, so as to form saw-blades of different lengths. The punches and dies for cutting the teeth, as well as the tools for forming the proper set therein, are preferably arranged in sections rather than in one continuous or solid tool, so that they may be more readily adjusted with reference to each other, and also for the purpose of removing or inserting a part thereof when forming saws of different lengths. To establish a perfect alignment of the cutting-edges of the several sections comprising the dies, I prefer that they rest upon a yielding bed—rubber, for instance—so that any difference in the thickness of the sections or spring therein incidental to the hardening or tempering of the same may be fully compensated for. All of which improvements will be more fully set forth in the following specification, and such features as I believe to be new and novel particularly pointed out in the claims to follow.

To enable others skilled in the art to which my invention belongs to understand and construct the same, reference is had to the accompanying drawings and to the figures and letters of reference marked thereon, which, together with the specification, explain my device, in which—

Fig. 3 is an enlarged detail bottom plan view of the gate of the first press—viz., the one at the extreme left, looking in the direction of arrow b, Fig. 1— showing more clearly the arrangement of the section-dies and the small punches in the bottom of the gate to form the necessary pin-holes in the saw-blade for attaching it to a frame. Such holes also serve a purpose in the operation of making the blade, which will be hereinafter more fully described.

Figure 1:
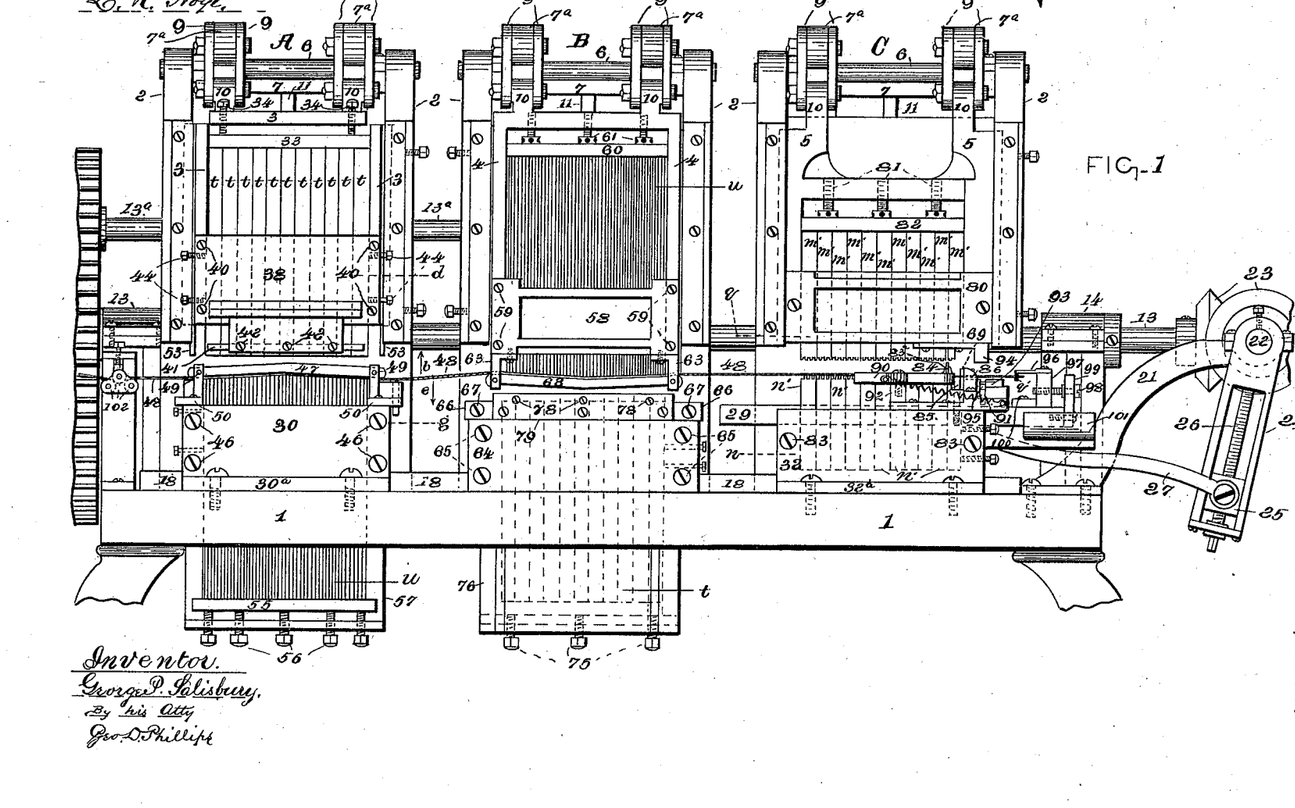
Figure 1 represents a reduced front elevation of the combination machine consisting of the three presses mounted upon a supporting-bed, the legs of which are shown broken, as is also the driving-gear, which gear is mounted upon a driving-shaft journaled in supports placed in rear of said presses; also a broken view of one of the bevel-gears that operate the mechanism for drawing the metal saw-strip through its several operations; also a view of the short jack-shaft above the main shaft and carrying a driving-pulley. (Not shown.) In this view the gates of all the presses are elevated.
Figure 2:
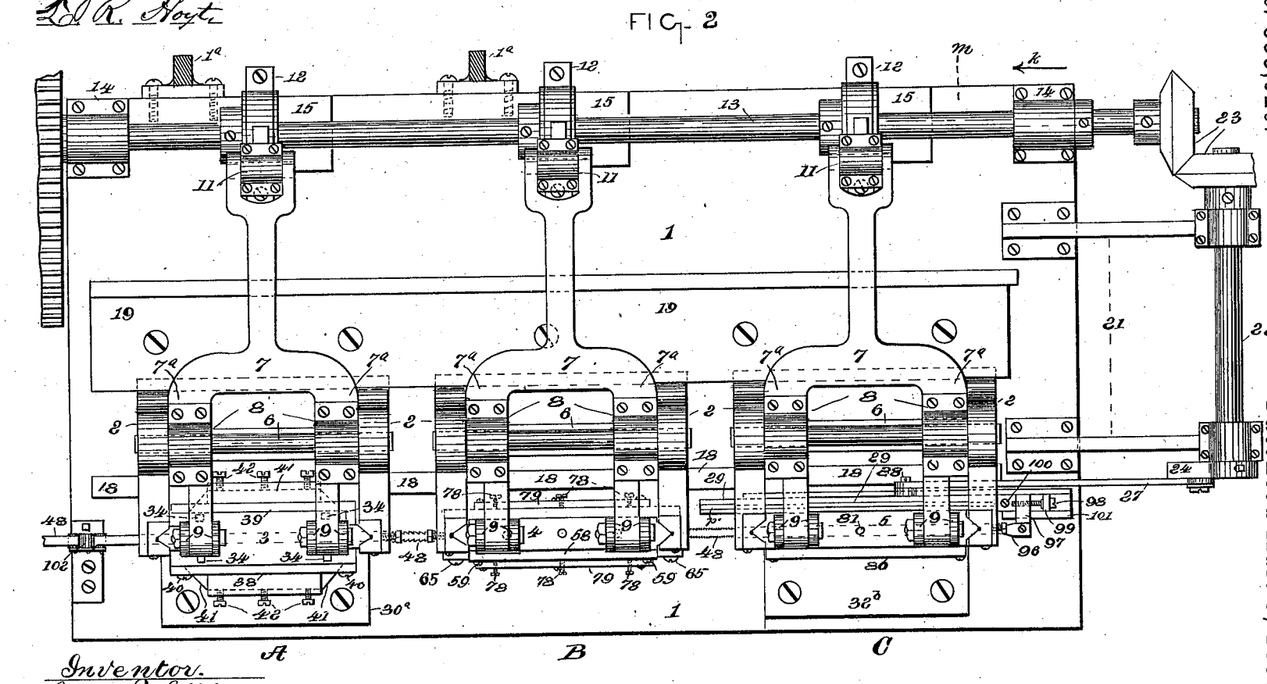
Fig. 2 is a reduced plan view of the machine shown in Fig. 1, looking in the direction of arrow a, showing more clearly the manner of operating the levers connected with the gates of the several presses from eccentrics mounted upon the main driving-shaft. In this view, as well as in Fig. 1, the metal strip or ribbon from which the saw-blades are made extends continuously through the three presses in readiness to be operated upon. The short jack-shaft in Fig. 1, carrying a driving-pulley, (not shown,) is removed from this view. The supporting-standards therefor, which are bolted to the rear edge of the machine-bed, are in consequence shown broken.
Figure 12:
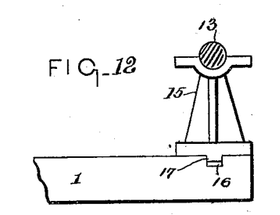
Fig. 12 is a detail side elevation of one of the adjustable shaft-supporting standards, looking in the direction of arrow k, Fig. 2, broken view of the bed, and sectional view of the driving-shaft through line m.

Its construction and operation are as follows, beginning first with a general description of the construction and operation of the whole machine as shown in Figs. 1 and 2, and then with a detailed description of the operation of the several presses and parts connected therewith:

1 represents the machine-bed; A, B, and C, the first, second, and third presses mounted thereon. As the only difference in these three presses lies in the different forms of their several gates and the tools therein, all such features or parts that are common to all will, to avoid confusion, be designated by the same figure of reference. Therefore 2 represents the uprights or side frames in which the gates 3, 4, and 5 are operatively mounted in a manner common to all presses, and therefore requiring no special description. 6 are shafts between the uprights 2 for supporting the gate-operating levers 7, whose branches 7ª are, by means of the boxes 8, journaled thereon. The outer ends of these several branches (see Fig. 1) are pivotally connected to the links 9, which links are in turn pivotally connected to the lugs 10 of the several gates, as shown. The other ends of the levers 7, Fig. 2, are journaled to the vertical arms 11 of the eccentrics 12, which eccentrics are mounted upon the driving-shaft 13, and such shaft is supported in the standards 14 and 15. The end standards, 14, are stationary, while the intermediate ones, 15, are not fastened to the bed, but are arranged to be shifted thereon so as to support the shaft 13 close to the eccentrics when such eccentrics are made to assume different positions on shaft 13, for the purpose presently to be described. The slot 16 (see Fig. 12) is provided in the bed 1 to receive the rib 17 of the standards 15, whereby their alignment with the bed and shaft is at all times maintained.

18, Figs. 1 and 2, is a stationary rib or projection of the bed against which the lower front edge of the several presses are gibbed, which feature will not only preserve the longitudinal alignment of the said presses, but also, in connection with the gib-plate 19 and the rib or projection 20, hold the presses firmly in any position. This feature enables the presses to be adjusted relative to each other for the purpose of making saws of different lengths.

21 are brackets supporting the short shaft 22, which derives its motion from shaft 13 through the bevel-gears 23. On the forward end of shaft 22 is the slotted arm 24, (seen more clearly at Fig. 1,) which carries the sliding block 25 and adjusting-screw 26. One end of the connecting-rod 27 is pivotally supported to block 25 and its other end to the stud 28 (see also Figs. 2 and 19) of the take-up slide 29.

The dies t, of which there are twenty-two connected with each of the two presses A and B, a detailed description of which will presently be given, are placed in the gate 3 of the first press, A, eleven on each side of the vertical central line thereof, while the punches u, eleven in number, are placed in the punch-holder 30, having the angular projection 30ª, with bolt-holes therein for securing it to the bed 1, as shown. In the second press, B, the punches are arranged in the gate 4, while the dies t are secured in the holder 31 and also extend below the bed 1.

It will be understood that the dies and punches connected with the presses A and B are precisely alike, the object of reversing them being to throw the bur formed on the stock in cutting the teeth on both sides of the same.

m' represents the saw-setting tools, of which there are eleven in the gate 5 of the press C, and n' represents a corresponding number, similarly constructed, in the holder 32. These latter do not project below the bed of the machine as in the other presses.

Figure 3:
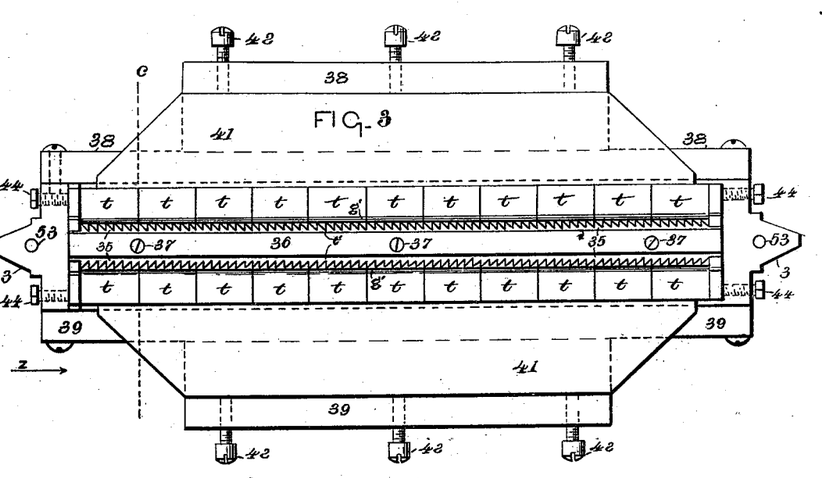
Figure 4:
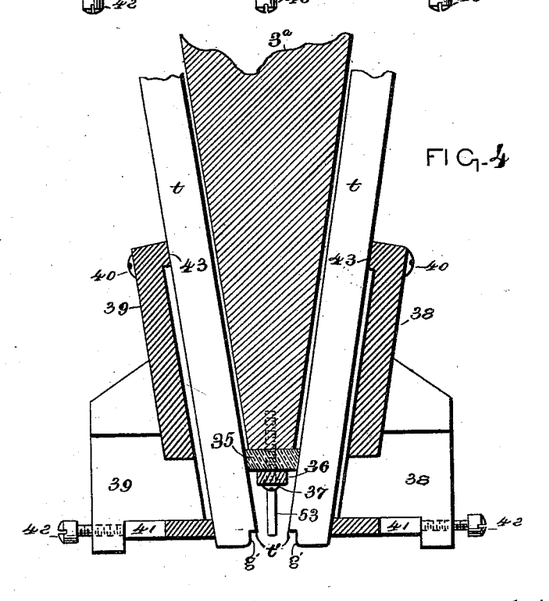
Fig. 4 is an enlarged vertical sectional elevation of the gate shown in Fig. 3 through dotted line c, and a broken transverse section of the gate and dies through line d of Fig. 1, showing more clearly the manner of setting the dies with respect to each other, and also the rubber strip against which the faces of the said dies rest; also one of the punches for forming the pin-holes in the saw-blade.

I will now proceed to describe in detail the construction and operation of the several press-tools and their operating mechanism, beginning with the gate 3 of press A, reference being had more particularly to Figs. 3 and 4.

Figure 8:
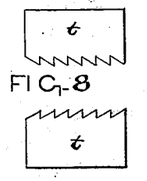
Fig. 8 is a full-size detail view of the end of two of the die-sections placed in operative position with respect to each other.

The dies t (shown full size in Fig. 8) are about twelve inches long and have cutting-teeth, as shown, on one side only and running preferably the entire length of each die. A row of eleven of these dies, Fig. 3, is arranged on each side of the center line of the gate 3, with their cutting-teeth facing each other, leaving a space between sufficient to admit the punches u, which (see full-size view of one of such punches, Fig. 9) are substantially the same length as the before-mentioned dies, but have teeth formed on both sides and running preferably the entire length thereof, which teeth match the teeth of said punches in the manner of any ordinary punch and die for the purpose of blanking metal.

The gate 3, Fig. 4, has the V-shaped central portion 3ª, and the dies are arranged longitudinally along each opposite face thereof, but do not come directly in contact therewith. This angular arrangement of the dies gives the proper clearance at the cutting ends t' of the teeth. The upper ends of the said dies rest against the blocking 33, placed on each side of the V-shaped central portion 3 of the gate, one of which blocks is shown at Fig. 1, and the longitudinal adjustment of said dies is effected by means of the screws 34, whose points engage the said blocking. The inner faces of the said dies $t$ rest against the rubber strip 35, which is attached to the end of the V-shaped center $3^a$ by means of the overlying metal strip 36 and the screws 37. This rubber strip extends along the entire length of this V-shaped center, so that each die will have a bearing thereagainst, whose object will presently be more fully explained.

The plates 38 and 39 (see also Fig. 1) are secured by the screws 40 directly to the gate 3. On the lower face of each of these plates (see also Fig. 3) are placed the die-clamping plates 41, which engage with the end of the dies $t$, and whose pressure thereagainst is regulated by the screws 42. The plates 38 and 39 are brought in contact with the dies $t$ only at the narrow point 43. (See Fig. 4.) Thus it will be observed that the said dies are supported at four separate and distinct points—viz., against the blocking 33, points 43 of the plates 38 and 39, clamping-plates 41 and the central rubber supporting-strip 35—the purpose of which I will now more fully explain.

As before mentioned, the several punches and dies are made in sections. This is absolutely necessary, as it would be practically impossible to construct a solid punch and die for cutting teeth along the entire length of a long saw-blade and harden such dies and punches without their springing, warping and expanding to such an extent that they would not match or properly engage one with the other, and more especially would this be noticed in my improved method of cutting only every other tooth in the first operation, and in the second form or cut the other teeth by an exact division of the large tooth previously formed. Therefore I make the punches and dies in narrow sections, each an exact counterpart of the other as regards the pitch and other dimensions, and the teeth are so formed on each section that when they are arranged alongside of each other there will be no break or faulting in the pitch throughout the entire series, and will in appearance resemble a solid tool. Expansion and deflection, that will take place in hardening, can thus be corrected in each individual section much better than in a solid tool. If the sections have expanded in their width they are ground to fit the proper gage; if bent or deflected they can be straightened. In this way all the greater errors may be eliminated, especially the increased width. When, therefore, the dies are arranged in the order shown in Figs. 3 and 4, with their toothed faces resting against the rubber strip 35 and the punches $u$, which (see Figs. 1, 5 and 6) are firmly held in the holder 30, in a manner presently to be described, they (the said punches) are brought between the toothed faces of the dies, and the set-screws 42, Figs. 3 and 4, are tightened, forcing them into operative relation with the punches. As the punches and dies before mentioned are exactly of the same width and pitch, each will, by means of this rubber strip, be made to match the other, for should there be the slightest variation in the transverse thickness of the punches or dies it is quite evident that each die, having an individual movement by reason of this rubber strip, will locate itself with its own particular punch and will go no farther.

From the foregoing will readily be seen the advantage of supporting the dies at the four points previously mentioned, as it enables the cutting edges or ends to be easily and accurately adjusted with respect to the punches. It will also be understood that any other material except rubber may be employed or any other form. I prefer the device shown and described as being cheaper and fully answering the purpose for all that is required.

The set-screws 44, Fig. 3, in the end of the gate 3 hold the dies firmly together.

Figure 5:
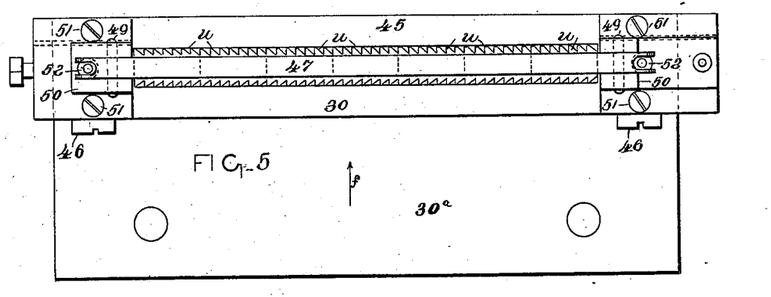
Fig. 5 is an enlarged detail upper plan view of the punch-holder connected with the first press, looking in the direction of arrow e, Fig. 1, showing the several punches firmly locked in the said holders, the stripper overlying the ends of the same, and forked openings in each end of said stripper to allow the punches for forming the pin-holes in the saw-blank to pass to their respective dies, situated immediately below.
Figure 6:
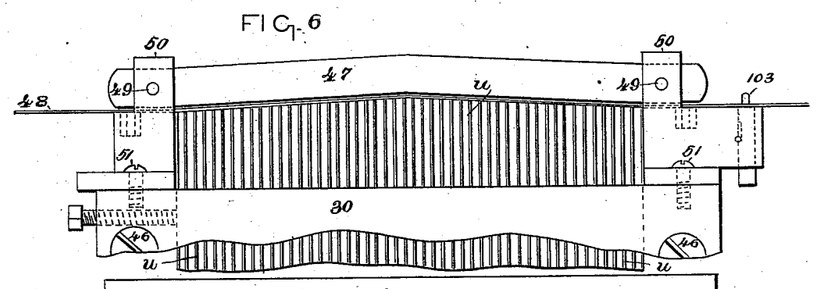
Fig. 6 is a side elevation of Fig. 5, looking in the direction of arrow f, and also a broken view of the punch-holder and punches through line g of Fig. 1, showing a section of the metal strip placed in operative position between the stripper and the tooth-forming punches; also in the end of the holder is shown a pin for locating the metal strip by means of the pin-holes previously formed.
Figure 9:
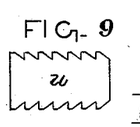
Fig. 9 is a full-size detail view of the end of one of the punch-sections adapted to pass between the die-sections shown in Fig. 8.
Figures 13, 14, 15, 16, 17, 18:
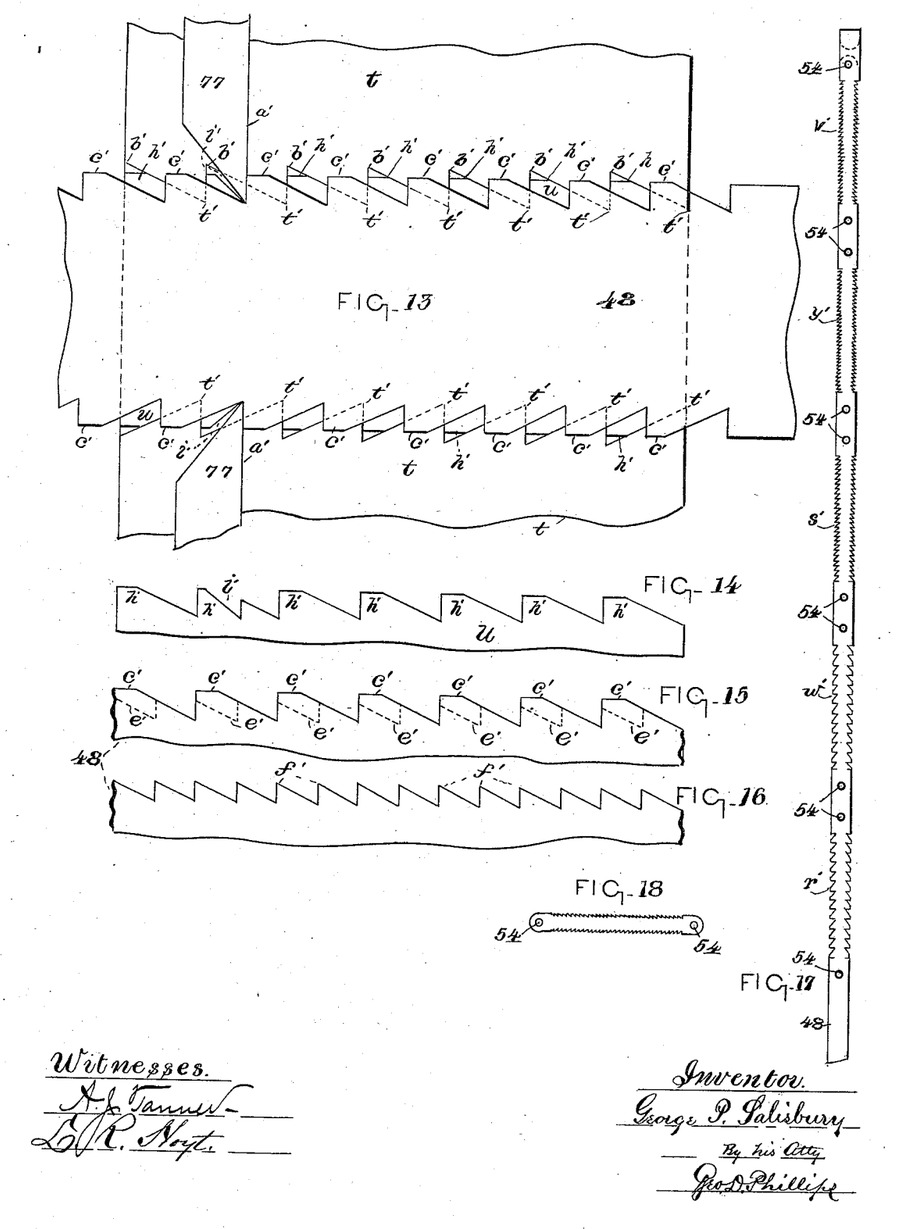
Fig. 13 is an enlarged broken detail view of the end of two of the die-sections connected with the second press, showing two of the saw-sets for locating the saw-blank, a section of which is shown in position for the second cutting.
Fig. 14 is an enlarged broken end view of one edge of one of the punch-sections, showing a portion of one of its teeth cut away to admit the point of the saw-set.
Fig. 15 is an enlarged broken view of the saw-blank, showing in dotted lines the stock to be removed by the second punching.
Fig. 16 is an enlarged broken section of the saw-blank after the second operation of punching.
Fig. 17 is a reduced view of a section of the saw-blank strip, showing the effect of the several operations except that of setting the teeth.
Fig. 18 shows a completed saw represented to have been cut from the strip shown in Fig. 17.

The punches, which, as before mentioned, are the same width as the dies, but, unlike them, cut, Fig. 9, on both sides, are arranged in the first press in the holder 30, Figs. 1, 5, and 6. In these latter views, for want of room, only seven punches are shown, and they are firmly held in the recessed holder by the plate 45 and screw 46. The stripper 47 is made narrower than the punches, overlying the same, with sufficient room between to permit a free movement of the saw-metal strip 48. This stripper is attached by pins 49 to the supports 50 mounted upon the holder 30, and firmly secured thereto by screws 51. The dies 52 in the said supports with which the punches 53 (see also Figs. 1, 3, and 4) engage to form the pin-hole 54 in the finished saw, Fig. 18, are so placed with reference to the teeth of the said punches that the holes will be in the proper position with respect to the end and teeth of the finished saw-blade.

The lower ends of the tooth-forming punches $u$, Fig. 1, rest upon the interposed blocking 55 of the adjusting-screws 56 of the support 57, arranged below the bed 1.

In the second press, B, Fig. 1, as before mentioned, the tools are reversed and the punches are placed in the gate and held thereto by means of the plate 58 and screws 59. The upper ends of the said punches are supported in like manner by the blocking 60 and adjusting-screws 61. The stripper 62 and its supports 63 are precisely like the arrangement shown in press A, except that the punches 53 are omitted.

Figure 7:
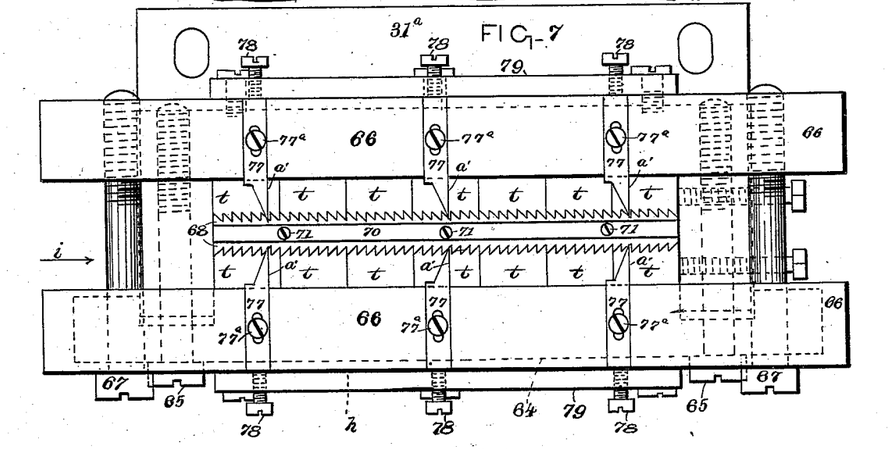
Fig. 7 is an upper plan view, looking in the direction of arrow e, Fig. 1, of the dies in the second or middle press, which, in this case, are supported in a holder on the bed, while the punches are supported in the gate immediately above the same, showing also six set edges or guides arranged to engage the face of the teeth formed in the first press and thus locate the metal strip central with the dies and in position for forming a tooth in the blank space left by the previous operation.
Figure 10:
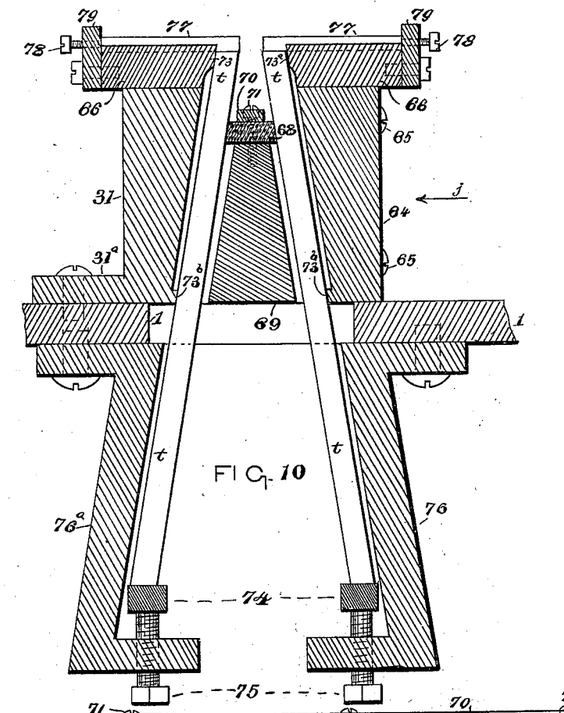
Fig. 10 is a detail vertical sectional elevation of the die-holder through line h of Fig. 7, looking in the direction of arrow i, and mounted upon a section of the bed, showing the dies in operative position, and also central rubber supporting-blocks.
Figure 11:
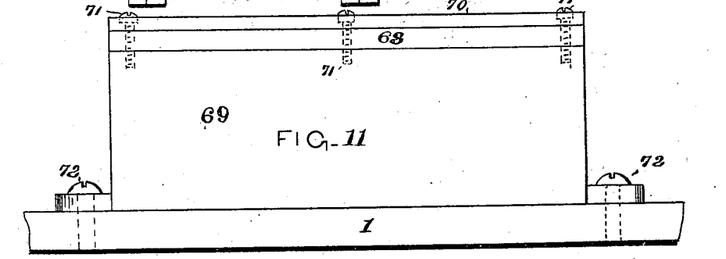
Fig. 11 is a detail side elevation, looking in the direction of arrow j, Fig. 10, of the central rubber supporting-block mounted upon a section of the bed.

The arrangement and manner of adjusting the punches in the holder 31 of press B are substantially the same as shown in press A, with only such changes as are necessary to suit the changed position, for a full understanding of which reference is had to Figs. 7, 10, and 11. The holder 31, Fig. 10, like the holder 30 of press A, has the projection $31^a$ for securing it to the bed. The dies are placed in a recess of the said holder and held there by the front plate 64 and screws 65. (Seen more clearly at Fig. 7.) The clamping-bars 66 perform the same function as the plates 41 of the press A, and these bars, Fig. 10, are cut away so as to leave a narrow bearing-surface 73 and 73ª against the back of dies $t$ corresponding substantially to the thickness of plate 41. The bolts 67 clamp these bars together, and by so doing exert an inward pressure on the said dies, seven only of which, for want of room, are shown in Fig. 7.

The rubber strip 68, Fig. 10, is held to the support 69 by means of the narrow metal strip 70 and screws 71, similar to the device shown in Fig. 4. The central support 69 (see also Fig. 11) is of sufficient length to fully support all of the dies and is attached to the bed 1 by screws 72. The holder 31 and its plate 64 touch the dies $t$ only at the points $73^b$ $73^b$, (see Fig. 10,) similar to the arrangement previously mentioned with respect to Fig. 4, while the said dies rest upon the blocking 74 of the adjusting-screws 75 in the brackets 76 and 76ª, projecting below the bed 1.

I will now fully explain the peculiar arrangement by which the second series of teeth are formed in the enlarged tooth or series of enlarged teeth from the first operation connected with press A.

Reference being had to Figs. 7, 10, 13, 14, 15 and 16, in the former are shown six set edges 77, overlying the dies and adjustably secured by screws 77ª in slots formed in the surface of the clamping-bars 66, and transversely adjustable therein by the screws 78 of plate 79. The forward ends of these set edges are tapered or wedge-shaped and are adapted thereby to enter the cut in the saw-strip made by the previous operation. These set edges (see Fig. 13) are so placed over the dies $t$ that their pointed ends or their straight faces $a'$ shall be exactly midway between the points of the teeth $t'$. (Shown in dotted position beneath the saw-strip 48.) Therefore when this saw-strip, which, as before mentioned, is held, Fig. 1, between the stripper and punches of the gate, is brought down upon the dies $t$, Fig. 13, the straight faces of six of the large teeth $c'$ of the saw-strip 48 will be brought against the straight face $a'$ of the saw-sets 77, thus evenly dividing this large tooth, so that the stock bounded by the dotted lines $e'$, Fig. 15, will be cut out and form the finished tooth shown in Fig. 16. It will therefore be observed that the points $f'$ of the finished tooth, Fig. 16, do not in the least depend for their sharpness on the lower corner of the lower angle $b'$ of the cutting-teeth of the dies, but rather on the lines of demarcation $e'$, Fig. 15, where they cut the straight and inclined faces of the large teeth $c'$, so that the lower or bottom corner or points of the teeth of the cutting-dies, on which it would be impossible to maintain a sharp point, may be blunted or slightly rounded, and in practice such is the case. The points of the teeth $h'$ of the punches $u$, Fig. 14, do not fill out sharp for the reason that they are of no account in forming the sharp point on the teeth of the saw-blade. For that reason I prefer to make the width of the said punches less than the depth of the teeth of the dies, (see Fig. 13,) and to select the stock of which the saw-blades are made the same width as the punches, making thereby less material to be cut out.

As the edges of the stock from which the saw-blades are made are more or less wavy or irregular, it would be impossible to locate the strip exactly in place on the second set of dies by means of such edges. For that reason I locate the said blank entirely by means of the points of the sets 77 engaging with the bottom corner of the cut made in the first press. In the first press this matter of locating is not so important, and the stock (see Fig. 4) is centralized with the cutting ends of the dies $t$ by the enlarged mouth formed by cutting back the ends of the dies, thus forming the step $g'$ on each die, which will make an opening wide enough to freely admit the stock and bring it central with the dies, slightly rounding the outer edges of the step or cut-away part $g'$.

As the cutting-teeth $h'$ of the punches $u$, Fig. 13, have no bearing on the saw-blank strip except that portion covered by the dotted position of the teeth $t'$ of the dies, or the stock embraced within the angle represented by the dotted lines $e'$, Fig. 15, the longitudinal cut $i'$, Figs. 13 and 14, is formed in one of the teeth of the said punch, so as to allow it to pass freely by the set edge with which it would otherwise come in contact.

Figure 19:
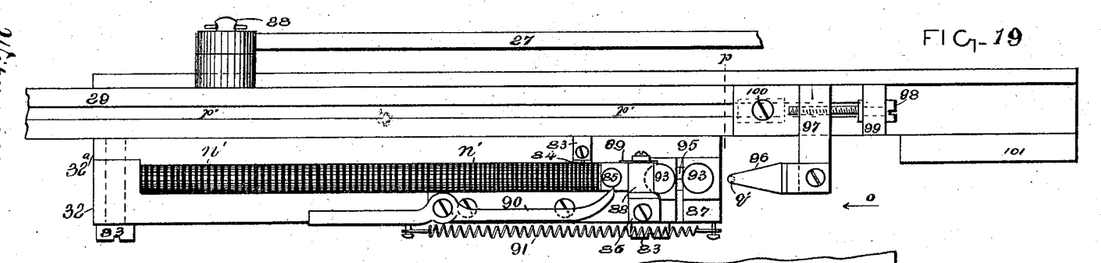
Fig. 19 is an upper plan view, looking in the direction of arrow a, Fig. 1, of the lower saw-set holder with the saw-sets therein, spring-lever stop to prevent the backward movement of the saw-strip, and cutting-off dies for the finished saw-blades, a broken view of the take-up slide carrying the take-up finger for pulling the metal saw-strip through the presses, and a broken view of the slide-operating lever.
Figures 20, 21, 22, 23, 24, 25, 26, 27:
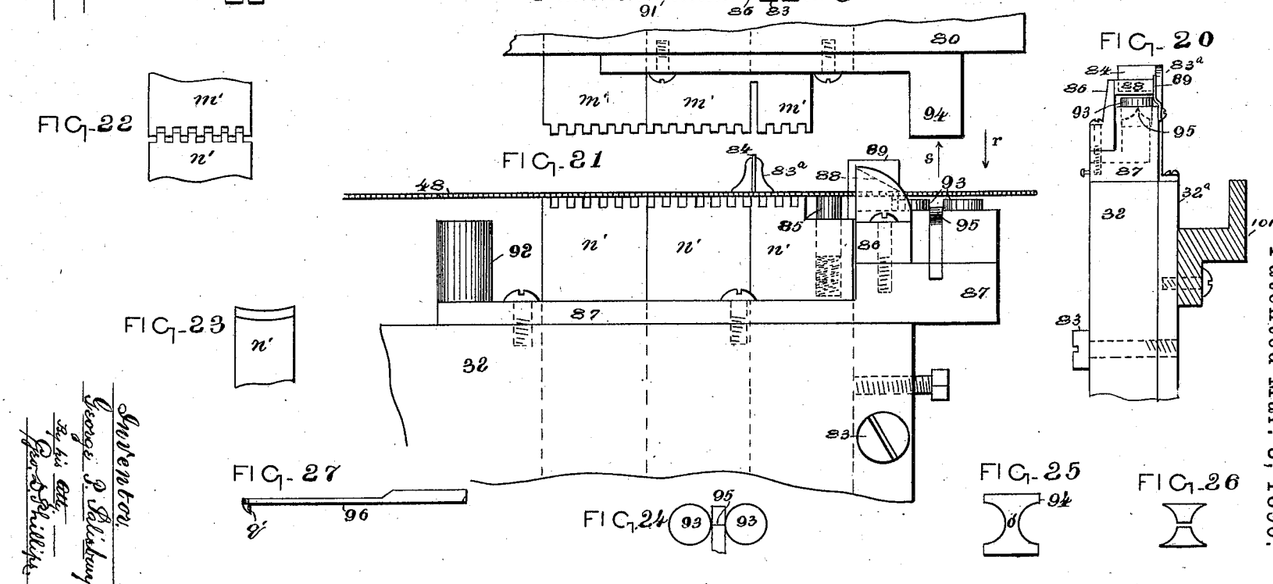
Fig. 20 is a broken detail end elevation, through line n of Fig. 1, of the lower saw-set holder, looking in the direction of arrow o, Fig. 19, and a section of the take-up-slide support through line p, with the take-up slide and the spring-lever removed.
Fig. 21 is a detail broken side elevation of the gate of the saw-set press through line q of Fig. 1, with the cutting-off punch and three of the saw-sets attached thereto, a broken view of the lower saw-set holder through line n of Fig. 1, with three saw-sets therein, and a section of the saw-strip lying thereon, with the spring-lever stop removed to show more clearly the operation of the spring-pin below the saw-strip and the thin counteracting-check for the same above the said saw-strip, with a kerf in the upper saw-sets to admit the same when the upper and lower sets are brought into engagement, and cutting-off dies and side guide for said strip.
Fig. 22 is a broken detail front elevation of two of the saw-sets operatively engaged.
Fig. 23 is a detail broken end elevation of one of the lower saw-sets, looking in the direction of arrow o, Fig. 19.
Fig. 24 is a detail upper plan view, looking in the direction of arrow r, Fig. 21, of the cutting-off dies, and a broken view of the cutter between said dies for severing the blank piece cut out of the metal saw-strip, whereby such blank pieces may release themselves from the die.
Fig. 25 is a detail bottom plan view of the cutting-off punch, looking in the direction of arrow s, Fig. 21.
Fig. 26 is a plan view of the blank piece cut out of the saw-strip by the operation of the punch and dies shown in Figs. 24 and 25, and the manner in which the before-mentioned knife or cutter placed between said dies severs the blank.
Fig. 27 is a detail side elevation of the take-up finger for drawing the saw-strip through the presses.

Regarding the manner of setting the teeth and other work connected with the last operation of making a saw-blade, reference is had to Figs. 1, 19, 20, 21, 22, 23, 24, 25, 26, and 27. The upper or movable tools or sets $m'$ are held in the gate 5 of press C in a manner similar to the arrangement of the gate of the press B—viz., by the plate 80—and are in like manner adjusted by the screws 81 acting against the blocking 82. The lower tools or sets $n'$ do not, as before mentioned, extend below the bed, but are firmly supported in the holder, which (see Fig. 19) is composed, like the other holders, of two parts 32 and 32ª and clamped together by the screws 83. These sets (see also Fig. 23) have concave ends, and (see Fig. 21) have square teeth of the same pitch as the cutting-teeth before mentioned. These teeth of the saw-sets are adapted to interlock, as shown at Fig. 22, so that when the saw-blank 48, (see Fig. 21,) in which the teeth are cut, is drawn forward, in a manner presently to be described, until the teeth therein lie over the spaces of the teeth of said set-tools, the said tools are engaged therewith, and by so doing deflect or set the teeth of the said blank.

83ª is a standard, Figs. 19, 20, and 21, attached in the manner shown to the part 32 of the tool-holder, and carries a thin overhanging arm 84 with which the saw-blank will engage to prevent its being carried up when the upper tools retreat. The upper tooth-space directly in line with this arm is cut deep enough, as shown, to admit the same when the saw-sets are brought together.

The spring-pin 85, Fig. 21, engages the lower surface of said saw-blank and will assist in forcing the saw-teeth out of the tooth-spaces of the lower set $n'$, and has also another function presently to be described.

The standard 86 is secured in the manner shown to the block 87 on the tool-holder, and it is furnished with the arm 88, Figs. 19 and 20, against which rests the spring 89 of block 87, the saw-blank being laterally held in position by means of this spring and standard 86, while the arm 88 will also check the upward spring of the saw-blank when the cutting-off punch retreats, which operation will also presently be described.

The spring-lever stop 90, Fig. 19, actuated by spring 91, and which stop is pivotally mounted on the projection 92, (see also Fig. 21,) engages the teeth of the saw-blank and will hold it in position, or at least prevent its being crowded back. The spring-pin 85 will limit the inward travel of the engaging end of this lever, so that it will not drag too hard on the saw-teeth when the strip is being drawn along.

The cutting-off dies 93 are round pins whose upper circumferential edges form the cutting part, and they are secured to the block 87, as shown, and the saw-blank (see Fig. 21) is by means of the spring-pin 85 lifted just above the upper surface of these dies. The punch 94, attached, as shown, to the plate 80 of the gate, (see also Fig. 25,) is shaped to partially encircle the said dies, the width of the bridge or partition $o'$ being exactly equal to the distance between the dies, so that when the saw-blank is severed both of the said ends will be rounded, as shown in Figs. 17 and 18. To prevent the blanks thus cut out of the saw-strip from wedging between the dies 93 the cutter 95 placed between said dies will, as these blanks are forced downward, cut the lower one, (see Fig. 26,) and the severed halves will drop on each side and away from said dies.

The take-up finger 96, Figs. 1, 2 and 19, particularly the latter, is mounted upon the adjustable block 97 of the slide 29, which slide is furnished with the slot $p'$ for that purpose and also the adjusting-screw 98 of the projection 99 on said slide. When said finger is properly adjusted with reference to the stroke or travel of said slide, the finger-block 97 is secured by the screw 100 thereto.

The end of the take-up finger (see Fig. 27) is armed with the pin $q'$, whose forward face is slightly rounded, so that when the last operation previously described—viz., of setting the teeth and cutting off the finished saw—is completed the take-up finger will move forward by means of the mechanism before mentioned and, its curved pin $q'$ striking the projecting end of the saw-blank, will, by reason of the natural spring of the saw-strip, which, owing to the lower position of the cutting-off dies 93, will have an opportunity to deflect or bend downward, which movement is also aided by the spring-pin 85, all combined, enable said pin $q'$ to override the saw-strip and drop into the pin-hole therein. As the slide is held in its support 101 by its weight alone, it will also lift slightly, so as to aid the take-up finger in reaching the upper surface of the said strip.

The return movement or stroke of the said finger will draw the saw-strip forward a distance that will represent the length of a completed saw, which when severed will return for another hold, as before, repeating the operation as long as the stock is presented.

At the start—that is, when the saw-blank strip 48 (see Figs. 1 and 2) is delivered from the reel (not shown)—it is first passed through the straightening-rolls 102, thence between the stripper 47 and punches $u$ of the press A, where the first operation, before fully described, of cutting the teeth and punching the pin-holes is performed. The saw-strip is then drawn forward by hand, and the pin 103, Fig. 6, is inserted into the second hole from the top of the strip shown in Fig. 17, thence into the fourth, sixth, eighth and tenth, respectively. This operation will have passed the strip along and located it successfully for all of the press operations until its end, as shown by the curved dotted lines, Fig. 17, is cut off, when the said pin is dropped and the take-up finger will engage, as before mentioned, and from thence out the operation will be automatic.

When the machine is working automatically there will be five saw-blades, Fig. 17, in different stages of operation, viz: $r'$ will be under press A, $s'$ under press B, and $v'$ under press C, while $w'$ and $y'$ will be between the said presses.

It will therefore readily be seen from the foregoing construction that this machine is capable of providing a complete saw having the teeth formed therein and set, pin-holes punched, and the ends rounded at every stroke of the press, thereby greatly reducing the cost of such articles. The tools for forming the teeth are easily kept in proper condition, as all that is necessary when they become dulled is to grind off the ends sufficient to again bring them to a sharp cutting-edge, and then adjust them by means of the screws, as shown. These cutting-dies and punches are of sufficient length to last for a long period of time, and, as they become shortened in grinding, extra blocking is placed between their outer ends and the adjusting-screws, thus utilizing nearly the whole section. The novel manner of forming the tooth gives much better results than if its cutting-points were formed by a mill or cutter, as usually done. Besides, the teeth are cut on both sides of the blade, so that when one side is dulled it can be reversed, thus making one blade last as long as two formerly did.

The adjustable features of the presses by which they are moved along the bed, combined with the sectional arrangement of the punches and dies, enable the machine to be readily adjusted for long or short saw-blades. For short blades, when the presses are brought closer together, some of the tooth-forming punches and dies are removed and blocking substituted therefor.

While I show the various sets of tools for performing the several operations necessary to complete a saw-blade as arranged in ordinary presses having vertically-operating gates or slides, I do not wish to be strictly confined to their use, but hold myself at liberty to arrange these several sets to operate horizontally as well, or to substitute other well-known means for holding and operating them.

It will also be fully understood that I hold myself at liberty to dispense with the double arrangement of dies and punches for cutting teeth on both edges of a saw-blade, and to employ tools necessary for cutting teeth on one side only of the blade, as in some instances the trade may require blades having this latter feature.

In constructing the punch-sections it would no doubt be advisable in most cases to construct as many sections as teeth—i. e., each individual punch would represent a tooth on the saw-blade. In this way the several punch-sections can be made with greater accuracy, and the combined pitch of the individual sections, when placed side by side, would be more uniform, as the sides, if the sections were too thick, could be ground off, or, if too thin, packing could be placed between the individual sections so as to bring the whole number of sections to a uniform pitch.

In some saws that do not require the teeth to be set the third press may be dispensed with and the take-up finger and cutting-off punches arranged to act in connection with the tooth-forming press.

Having thus described my invention, what I claim as new, and desire to secure by Letters Patent, is—

1. In a machine for forming teeth in saw-blades, the combination of a series of longitudinal tooth-cutting tools having cutting-teeth formed in one side and parallel with their length, said tools arranged side by side to form in effect a continuous tool, a yielding support therefor, and means for securing, adjusting and operating said tools, as set forth.

2. The combined machine for making saw-blades, comprising in combination independent sets of tools serially arranged, the first set cutting teeth in a saw-blank coarser than required, the second set cutting a section from the coarse tooth previously formed, the third set of tools setting the teeth, as described, and means for holding, adjusting and operating all of said sets of tools, for the purpose set forth.

3. The combined machine for making saw-blades, comprising in combination a series of independent groups or sets of tools arranged in serial order to operate upon a metal strip and means for holding and operating said tools, means for automatically advancing the metal saw-strip through the different operations, the first set of tools forming a series of coarse teeth in the edge of said strip the full distance required for the saw when completed, the second set of tools cutting a section from the previously-formed coarse tooth, thus establishing the proper pitch of the blank, the third set of tools setting the teeth, and means for severing the saw from the strip.

4. The combined machine, comprising in combination a supporting-bed, a series of presses mounted thereon, in alignment with each other, and arranged to be adjusted along said bed to and from each other for saws of different lengths, and means for securing them in any position required, each of said presses carrying a set of tools to operate upon a strip of metal, forming and setting the saw-teeth therein and severing a completed saw-blade therefrom, and means for advancing said strip through all of the required operations.

5. The combined machine for making saw-blades, comprising in combination, a supporting-bed, longitudinally adjustable thereon, and arranged to be secured in any required position, the first press having a set of dies and punches having cutting-teeth formed thereon, as shown, whose pitch is coarser than the pitch required for the finished saw-blade, stripper for said punches and dies, said press also carrying the pin-hole punches and dies for the purpose set forth, the second press having tools similar to the first press, means for advancing the saw-strip thereto, and means on such second press for locating the said strip by the previously-formed teeth, and in a position for cutting a second row of teeth from the coarse teeth formed by the first press, said saw-strip advanced to the third press, which contains tools for setting the teeth and severing a completed blade from said strip, and means for adjusting and operating the several sets of tools for the purpose set forth.

6. The herein-described combination of operative elements for forming teeth on both edges of saw-blades, consisting of the cutting-die sections having teeth formed thereon as shown, and arranged in double sets facing each other, a yielding support between such sets, combined with punch-sections as shown and arranged to pass between the double arrangement of die-sets, and means for adjusting, clamping and operating all of said tools, for forming the teeth, as set forth.

7. In a machine for making saw-blades, the combination of a supporting-bed, presses adjustably mounted thereon, the first press carrying the cutting-dies and punches as shown, the second press carrying similar tools and punches for forming the teeth in the saw-blade, but having such tools reversed, so as to throw the bur formed in cutting the teeth, on the opposite side of the saw-blade from that shown or produced by the first press, as set forth.

8. In a combined machine for cutting teeth on a saw-blade, the combination of a series of longitudinal punches and die-sections, each section having a series of cutting-teeth formed on its outer face and running longitudinally parallel therewith, the pitch of said teeth being greater than that required for the teeth of the said blade when finished, and consequently cutting a coarser tooth therein, with a second set of punches and dies constructed similar to the before-mentioned first set, and operated independent thereof, the said second set cutting out the stock left from the first operation and thus forming teeth on the said saw-blade of the proper pitch required, and means for holding and operating said punches and dies.

9. In a combined machine for making saw-blades of the character described, the combination of the tooth-forming dies and punches, pin-hole-forming punches and dies for the saw-blades as shown, the take-up finger and locating-pin for the pin-holes when formed for locating the saw-strip through all the succeeding operations until the take-up finger can engage and operate the strip automatically, as set forth.

10. A combined machine for making a completed saw-blade from a metal strip, comprising in combination the following elements, viz: tooth-forming and tooth-setting tools, take-up finger for drawing the metal strip through the several machines, spring-actuated stop to retain the said strip on the saw-setting tools, overlying checks for limiting the upward movement of said strip when the saw-sets and cutting-off tool are disengaging therefrom, spring-pin on the opposite side to allow the end thereof to drop when the take-up finger engages therewith, cutting-off punch and die arranged as shown for severing a completed blade from the strip, and a separating knife or cutter connected therewith for severing the blank and thereby preventing clogging of said cutting-off die, as shown and described.

11. In a combined machine for making saw-blades, the presses A, B, and C, as shown, the supporting-bed therefor, said presses equipped with the tools as shown for performing all of the operations necessary for making a complete saw-blade, said presses having an adjustment on said bed for different lengths of blades, combined with the tooth forming and setting sections, whereby the same may be increased or decreased within certain prescribed limits to suit the changed position of said presses, means for automatically drawing the metal strip from a reel or device of like character, so that all the operations may be continuously formed on said strip and a completed saw-blade severed from the end thereof, substantially as and for the purpose described and set forth.

12. A combined machine for cutting saw-teeth in a metal strip, comprising presses carrying tooth-forming punches and dies, a support for such presses, and means for adjusting them thereon, so as to form saw-blades of different lengths, said tooth-forming punches and dies placed side by side in sections as shown, to assist, in connection with the adjustable feature of said presses, in varying the length of the saw-blades.

13. In a machine for forming teeth on saw-blades, of the character described, a series of longitudinal punch-sections whose edges conform to the shape of the teeth to be formed on the saw-blade, said sections closely and firmly abutting each other so that their ends will form, substantially, a solid punch and their longitudinal toothed edges presenting an unbroken pitch throughout the entire series of such punch-section, but double the pitch required for the saw-blade when finished, combined with a series of die-sections with which such punch-sections engage to form teeth on a saw-blade, and means for holding and operating such punch and die sections, as set forth.

14. In a combined machine for cutting teeth on a saw-blade, a series of punch and die sections for cutting a series of coarse teeth on a saw-blade, a second series of punch and die sections similarly arranged for cutting a series of teeth from the previously-formed coarse teeth, and guides for locating such coarse teeth for performing the second operation of cutting the teeth, as set forth.

Signed at New Haven, in the county of New Haven and State of Connecticut, this 14th day of April, A. D. 1893.

GEORGE P. SALISBURY.

Witnesses:
GEO. D. PHILLIPS,
WILLIAM L. GREEN.